Aug. 17, 1971   R. R. VOIGT   3,600,138
CRYSTALLIZER
Filed Aug. 11, 1967
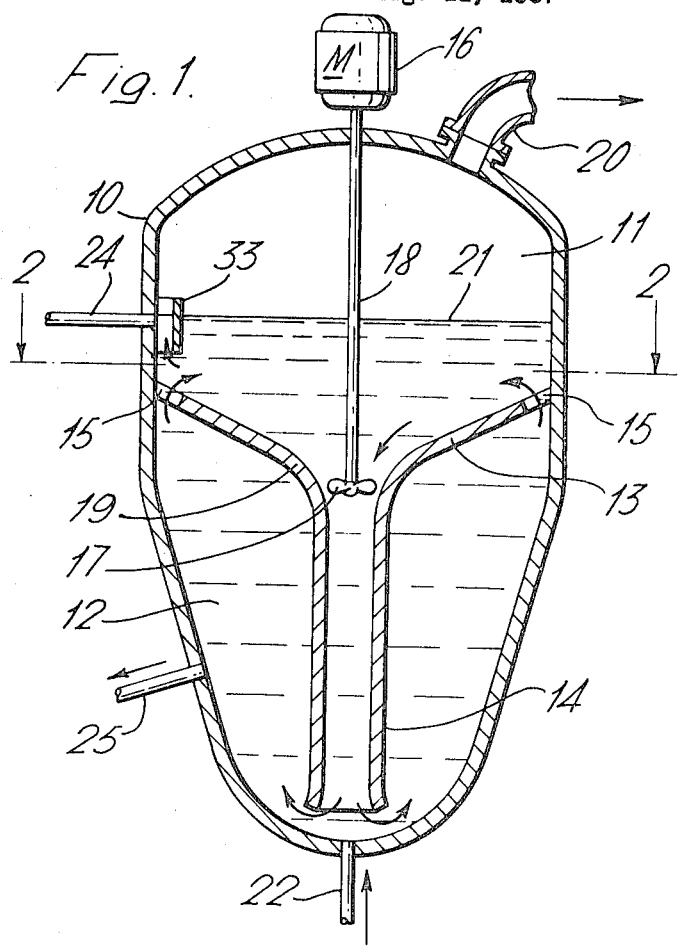
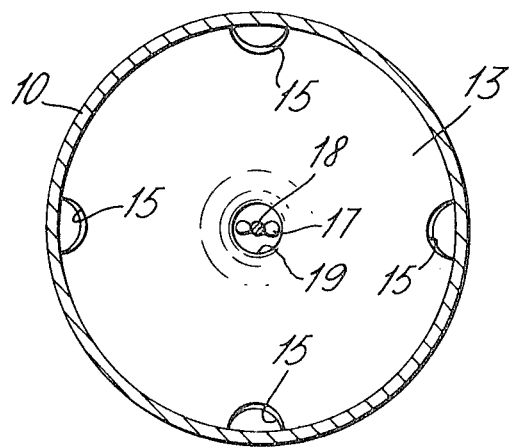

United States Patent Office 3,600,138
Patented Aug. 17, 1971

3,600,138
CRYSTALLIZER
Robert R. Voigt, Warren, Pa., assignor to Struthers
Scientific and International Corporation
Filed Aug. 11, 1967, Ser. No. 659,953
Claims priority, application Great Britain, Aug. 23, 1966,
37,701/66
Int. Cl. B01d 9/02
U.S. Cl. 23—273                                    1 Claim

ABSTRACT OF THE DISCLOSURE

A vacuum evaporator within a single shell having a downwardly extending cone within the shell and having a tail pipe extending downward from the cone, and means within the tail pipe circulating a mother liquor downward in said tail pipe to flow upward about the cone, the upper chamber being a vacuum evaporating chamber and the lower chamber being a crystallization chamber.

BACKGROUND OF THE INVENTION

Vacuum evaporation crystallizers induce crystallization in a solution by cooling the solution by vacuum evaporation. Heretofore, a mother liquor of the solution was pumped into an upper vacuum chamber to be cooled by evaporation. The cooled solution from this chamber was then passed into a lower chamber from which the solution was withdrawn by an external pump and piping to be recirculated to the upper chamber. Crystals settling from solution were removed as a slurry from the lower chamber to be centrifuged or otherwise separated from solution as a desired product.

SUMMARY OF THE INVENTION

This invention provides a vacuum evaporator comprising a cylindrical shell having a domed top and a tapering bottom, a cone within said shell dividing said shell into upper and lower chambers, said cone containing a central opening and peripheral openings, a tail pipe descending from said cone below and about said central opening in said cone, an agitator propeller disposed near the central opening in said cone, means driving said propeller circulating solution downward through said central opening and said tail pipe to return upward through said peripheral openings, and means drawing a vacuum in said upper chamber providing vacuum evaporation in said upper chamber.

The particular construction of the vacuum evaporation crystallizer of this invention avoids the need for an external recirculating pump and piping to provide a less costly crystallizer of a given capacity. In addition, its particular configuration provides a superior product slurry of more uniform crystals in a mother liquor.

BRIEF DESCRIPTION OF THE DRAWING

FIG. 1 is a longitudinal vertical section through a vacuum evaporator according to this invention; and
FIG. 2 is a section taken on line 2—2 of FIG. 1.

DESCRIPTION OF THE PREFERRED EMBODIMENT

Referring to the drawing in detail, an evaporator shell 10 has an upper domed chamber 11 and a lower tapering chamber 12. A cone 13, having a central opening 19 from which a tail pipe 14 descends, divides shell 10 into the upper and lower chambers 11 and 12. Upper peripheral openings 15 are formed in cone 13. A motor 16 drives the agitator and propeller 17 by means of the shaft 18. Propeller 17 circulates solution in shell 10 from upper chamber 11 down tail pipe 14 into lower chamber 12 to return to upper chamber 11 through the peripheral openings 15.

A vacuum apparatus (not shown) is connected to fitting 20 so that the vacuum formed thereby in chamber 11 cools the solution thereby by vacuum evaporation at the fluid surface 21. The fluid flow from the openings 15 inward presents a moving fluid surface to promote this cooling. Feed solution is introduced through pipe 22. A baffle 33 enables a clear solution overflow to be withdrawn through pipe 24. A slurry rich in crystals more dense than the mother liquor is withdraw through pipe 25. Product crystals are separated from this slurry.

The crystallizer of this invention may be used to crystallize $CuSO_4.5H_2O$; $KCl$; $Na_2Cr_2O_7.2H_2O$; or the like from a water solution. Such crystals are more dense than the mother liquor and so settle in the lower chamber 12. Since cone 13 makes solution passing from chamber 12 to chamber 11 turn substantially 90 degrees, there is a smaller chance that the solution will transport heavy crystals. Baffle 13 spreads the rising flow of solution so that it flows evenly inward along the fluid surface 21. This makes the entire fluid surface 21 effective for vapor release and cooling.

What is claimed is:
1. A vacuum evaporation crystallizer comprising, in combination, a single, generally cylindrical outer shell having a domed top and a tapered lower portion, a downwardly extending con within said shell dividing said shell into an upper vacuum evaporating chamber and a lower crystallization chamber, said cone having a central opening and a tail pipe extending downward therefrom into said tapered lower portion of said shell the tail pipe being flared at its lower extremity, said cone having outer portions spaced away from said shell forming openings spaced about the inside of said shell, a propeller at the juncture of the cone and said tail pipe, a shaft extending downward within said tail pipe mounting said propeller, a motor driving said shaft and thereby said propeller, means drawing a vacuum in said upper chamber, said propeller circulating mother liquor downward in said tail pipe to circulate upward about said cone, fluid flow of mother liquor upward through said openings in said cone and downward into said tail pipe forming an inwardly moving fluid surface within said upper vacuum evaporation chamber, pipe means withdrawing a mother liquor and crystal slurry from said lower chamber, and a mother liquor feed inlet disposed directly below said tail pipe in the lower portion of said shell, said motor being mounted above the level of said mother liquor in said outer shell, a clear solution overflow outlet from the cylindrical outer shell at a point above the cone.

References Cited

UNITED STATES PATENTS

| | | | |
|---|---|---|---|
| 1,428,557 | 9/1922 | Ray | 159—45 |
| 1,945,281 | 1/1934 | Leithaüser | 159—45 |
| 2,232,115 | 2/1941 | Koppers | 23—273 |
| 2,856,270 | 10/1958 | Saeman | 23—273 |
| 3,071,447 | 1/1963 | Bernhardi | 23—273 |
| 3,306,710 | 2/1967 | Messing | 159—45X |

FOREIGN PATENTS 387,631   2/1933   Great Britain _____ 159—45

NORMAN YUDKOFF, Primary Examiner
R. T. FOSTER, Assistant Examiner

U.S. Cl. X.R.
159—45